July 7, 1925.　　　　　　　　　　　　　　　1,545,068
A. J. SAVOY
SHOCK ABSORBER FOR VEHICLES
Filed Oct. 28, 1922
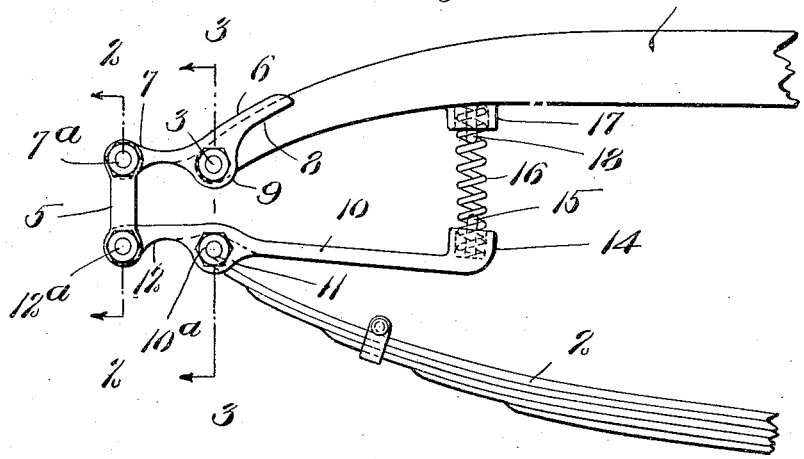
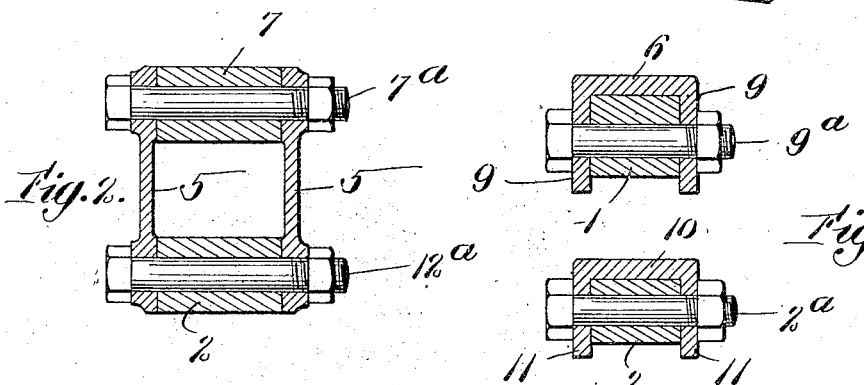
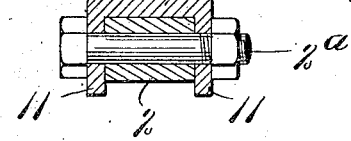
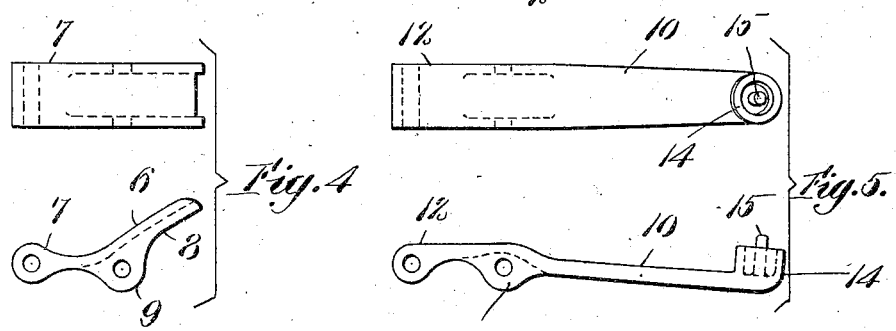
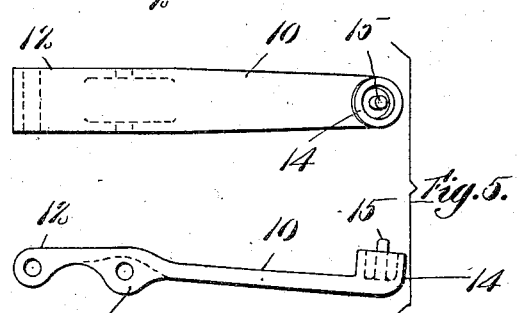
Inventor:
Albert J. Savoy
by Geo. N. Goddard atty Patented July 7, 1925.

1,545,068

UNITED STATES PATENT OFFICE.

ALBERT J. SAVOY, OF NORTH ATTLEBORO, MASSACHUSETTS.

SHOCK ABSORBER FOR VEHICLES.

Application filed October 28, 1922. Serial No. 597,544.

*To all whom it may concern:*

Be it known that I, ALBERT J. SAVOY, a citizen of the Dominion of Canada, and resident of North Attleboro, in the county of Bristol and State of Massachusetts, have invented a certain new and useful Improvement in Shock Absorbers for Vehicles, of which the following is a specification.

This invention relates to shock absorbers for vehicles, usually motor vehicles, and is intended to provide a simple easily applied device that shall serve the purpose of easing or lessening the transmission of road shocks to the main supporting springs of the vehicle, usually leaf springs of various forms, while at the same time avoiding the evil consequences of actually increasing the road stress exerted upon the leaf spring.

Heretofore it has been proposed to use a shock absorbing lever connected with a spring, but the arrangements have been such that the stress of the load, as carried by the body-supporting or main spring, has actually been increased so that the lever in practice would actually serve to accentuate or multiply the thrust of the weight of the load upon its main carrying spring.

According to the present invention I overcome this difficulty by applying the lever and the buffer spring in such a way that the weight of the car body is distributed through the buffer spring connection and a pivotal connection between opposite ends of the shock-absorbing lever and the body frame, or in other words, a part of the load is carried on each end of the lever, the down thrust at one end to be supported by a link connection, and at the other end of the lever by a yielding or spring connection. This and other features of the invention will be more particularly described in the following specification and will be defined in the claims hereto annexed.

In the accompanying drawings I have shown a preferred form of my improvement applied to the rear end of a motor car chassis which supports the car body, only that part of the body-supporting frame being shown which is necessary to a complete understanding of the invention.

In said drawings:

Figure 1 is a side elevation showing my improved shock absorber applied for service.

Figures 2 and 3 show cross sectional views of the upper and lower supporting members on vertical planes 2 and 3 of Figure 1.

Figure 4 is a detail view showing in plan and side elevations, respectively the saddle or bracket forming an extension of the rear end of the chassis frame.

Figure 5 shows in plan and side elevations the detailed construction of the shock absorbing lever.

In the practice of this invention, according to the form illustrated, to the end of the body supporting frame or chassis 1, I apply a saddle or bracket 6, comprising a forwardly extending arm provided with side flanges 8, fitting over the sides of the body-supporting frame and provided with lateral ears 9, perforated to receive an attaching bolt 3, by which it is bolted securely in place. The bracket has a rearwardly extending arm 7, provided with an eye to receive an attaching bolt $7^a$, by means of which the shackle member 5, which is removed from the rear end of the member 1, is pivotally connected to said extension.

The lower end of the shackle having been removed from the eye at the rear end of the leaf spring 2, is pivotally connected with the short or power arm 12, of a shock-absorbing lever. Said shock-absorbing lever 10, is provided with lateral parallel ears 11, perforated to receive a connecting bolt $12^a$, passed through the eye at the rear end of the spring to form a pivotal connection as well as a fulcrum upon which the lever 10—12 rocks when in use.

At the forward end of its resistance arm 10, the lever is provided with spring-retaining means such as a cup 14, and a centralizing pin 15, to afford a seat and guide for the lower end of a spiral compression spring 16. The upper end of said compression spring is mounted in an equivalent spring-retaining member 17, which may be provided with a centralizing guide pin 18.

The connections at $7^a$, $12^a$ and $10^a$ are all pivotal connections. The bolt connection 3, suffices without making any special provision for rigidly securing the forward end of the bracket 6, to the frame 1, since the weight of the car body always tends to keep this arm 6, in close engagement with the chassis side bar 1.

Careful consideration of the construction shown will make it clear that the weight of this part of the chassis has two points of support, one through the rigid or noncompressible link or pivoted shackle 5, the other through buffer spring 16.

By preference I make the buffer supporting arm or resistance arm 10, considerably longer than power arm 12 of the lever so that the greater part of the weight of the car is carried by the link connection, and the lesser part of the weight by the buffer spring. Assuming that the length of the power arm 12, is one-third of the effective length of the resistance arm 10, then it will be obvious that the buffer spring carries one-fourth of the load of this part of the body frame, while the link connection carries three-fourths of the load but, of course, this ratio may be changed to suit different conditions.

Light road shocks will be absorbed or taken up to a large extent by the buffer spring, the spring being compressed under the influence of the shock since the buffer spring is lighter or offers less resistance than the leaf spring and will yield more readily than will the leaf spring, so that a shock that would have but slight effect on the leaf spring will be cared for by the buffer spring. Heavier shocks, however, cause both a compression of the buffer spring and a depression of the leaf spring, but said depression will be of considerably less magnitude because a substantial part of the shock will have been taken up by the buffer spring 16, to that extent relieving the leaf spring from sudden blows or shocks.

As the compression of the thrust spring is exerted directly against the body-supporting frame in inverse ratio to the length of the arms of the lever, it will be seen that the load stress upon the leaf spring is not increased by the action of the lever. This will be clear if we suppose a construction in which the end 14, of the resistance arm thrusts against a fixed or immovable support instead of against the movable body frame. In that case the end 14 would be the fulcral point of the lever while the entire length of the lever would constitute the power arm, and the distance from the leaf spring connection 10ª to the fulcral point 14 would constitute the resistance arm. This would mean that the load strain would be multiplied in transmission through the lever because of the greater length of the weight or body-supporting arm 10, 12, comprising the whole lever. In other words, where the resistance arm of the lever abuts against a fixed member instead of the chassis frame, the lever then become a lever of the second class instead of a lever of the first class as in the present case and would increase the load stress on the main spring. It will therefore, be seen that the feature of supporting the chassis body through connection with both ends of the lever, one of which connections is a yielding or spring connection, is of much practical importance in easing the strain upon the axle and supporting springs, and this constitutes an important feature of the present invention. For the same reason the rebound is checked by this depression of the load and, moreover, as a substantial part of the road shock has been absorbed by the buffer spring the main spring will not be as much depressed and, consequently, will not produce as much rebound.

What I claim is:

1. In a shock absorber for vehicles, the combination with a chassis frame whose rear ends are provided with transverse bolt holes, a rearwardly extending bracket attached to said rear end by bolts inserted in said holes, a lever fulcrumed intermediate of its ends on the rear end of an axle-supported leaf spring, the short arm of said lever extending rearwardly and being pivotally connected with a vertical link that is pivotally suspended from the read end of said bracket, the long arm of the said lever extending forwardly, and a compression spring interposed between the forward end of the long arm and the frame, substantially as described.

2. In a shock absorber for vehicles, the combination with a chassis frame each of whose rear ends is provided with a transverse bolt hole, a bracket provided with opposite perforated ears intermediate of its ends to permit it to be detachably secured to the rear end of said frame by a bolt inserted in said bolt hole and passing through said ears, a link pivotally suspended from the rearward end of said bracket, a lever fulcrumed intermediate of its ends on the rear end of a frame-supporting leaf spring, the short arm of said lever being extended rearwardly and having pivotal connection with said link, the forward arm of said lever being provided, at its forward end, with a socket, and a compression spring seated in said socket and arranged to thrust upward against said frame, substantially as described.

In witness whereof, I have subscribed the above specification.

ALBERT J. SAVOY.